US006602939B2

(12) United States Patent
Eichenauer

(10) Patent No.: US 6,602,939 B2
(45) Date of Patent: Aug. 5, 2003

(54) ADDITIVE MIXTURES CONTAINING THERMOPLASTIC MOULDING COMPOSITIONS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/957,175

(22) Filed: Sep. 19, 2001

(65) Prior Publication Data

US 2002/0111408 A1 Aug. 15, 2002

(30) Foreign Application Priority Data

Sep. 21, 2000 (DE) .......................... 100 46 772

(51) Int. Cl.⁷ .............................. C08K 5/09; C08K 5/20; C08K 5/04
(52) U.S. Cl. ..................... 524/291; 524/62; 524/232; 524/251; 524/394; 524/399; 524/400
(58) Field of Search ..................... 524/62, 232, 394, 524/399, 400, 291, 251

(56) References Cited

U.S. PATENT DOCUMENTS

| | | | |
|---|---|---|---|
| 4,248,778 A | 2/1981 | Arnold et al. | 260/23.7 M |
| 5,049,613 A * | 9/1991 | Shimizu et al. | 525/66 |
| 5,210,135 A | 5/1993 | Eichenauer et al. | 523/71 |
| 5,658,985 A | 8/1997 | Eichenauer et al. | 525/83 |
| 6,140,426 A | 10/2000 | Sarabi et al. | 525/316 |

* cited by examiner

*Primary Examiner*—Kriellion A. Sanders
(74) *Attorney, Agent, or Firm*—Joseph C. Gil; Aron Preis; James R. Franks

(57) ABSTRACT

A thermoplastic molding composition suitable for preparing molded articles having improved mechanical properties is disclosed. The composition contains A) a (co)polymer of at least one monomer selected from the group consisting of styrene, α-methylstyrene, nuclear-substituted styrene, methyl methacrylate, acrylonitrile, methacrylonitrile, maleic anhydride and N-substituted maleimide , and B) a graft polymer of B.1) at least one member selected from the group consisting of styrene, α-methylstyrene, nuclear-substituted styrene, methyl methacrylate, acrylonitrile, methacrylonitrile, maleic anhydride and N-substituted maleimide on B.2) a rubber having a glass transition temperature of ≦10° C. and C) a mixture of at least 3 components selected from I) metallic compounds, II) esters III) amides and IV) certain specified compounds exemplified by oil or wax.

11 Claims, No Drawings

ADDITIVE MIXTURES CONTAINING THERMOPLASTIC MOULDING COMPOSITIONS

The subject of the present invention are compositions containing matrix polymer, graft polymer and special additive mixtures, their use for the production of moulded articles, as well as the moulded articles obtainable therefrom. The subject of the invention is also the additive combination.

ABS moulding compositions have already been used for many years in large quantities as thermoplastic resins for the production of all types of moulded parts. The property spectrum of these resins ranges from relatively brittle to extremely tough.

A special area of use of ABS moulding compositions is the production of moulded parts by injection moulding (e.g. housings, toys, vehicle parts), an important factor being in particular a very good flowability of the polymer material. Also, the moulded parts produced in this way must as a rule have a good notched-bar impact strength as well as a good resistance to thermal stresses.

The object therefore exists of achieving, for a given rubber content, a given rubber particle size and given matrix resin molecular weight, toughness values that are as high as possible while retaining the good thermoplastic flowability. In this connection the high toughness values should as far as possible be obtained independently of the type of matrix resin that is employed, and especially when using the styrene/acrylonitrile copolymers and α-methylstyrene/acrylonitrile copolymers typical of ABS.

One possible way of improving the toughness of ABS polymers with a given rubber content, given rubber particle size and given matrix molecular weight is to add special silicone oil compounds (see EP-A 6521); however, disadvantages may arise such as poor paintability, unsatisfactory printability or impaired yield stress values (danger of stress whitening). The addition of minor amounts of EPDM rubber (see EP-A 412 370) or AES polymer (see EP-A 412 371) has also been described. Both methods require the use of considerable amounts of relatively expensive additive components however.

The use of large amounts of individual low molecular weight additive components may in special cases improve the processability, although this is normally offset by a negative effect on other properties such as for example toughness, modulus of elasticity and thermal stability.

It has now been found that by using special additive mixtures, ABS products can be obtained having a very good combination of notched-bar impact strength (at room temperature as well as at low temperatures) and excellent processability.

The invention provides thermoplastic moulding compounds or compositions containing
A) 5 to 95 wt. %, preferably 10 to 90 wt. % and particularly preferably 20 to 75 wt. % of one or more thermoplastic homopolymers, copolymers or terpolymers of styrene, α-methylstyrene, nuclear-substituted styrene, methyl methacrylate, acrylonitrile, methacrylonitrile, maleic anhydride, N-substituted maleimide or mixtures thereof,
B) 5 to 95 wt. %, preferably 10 to 90 wt. % and particularly preferably 25 to 80 wt. % of one or more graft polymers of
B.1) 5 to 90 parts by weight, preferably 20 to 80 parts by weight and particularly preferably 25 to 60 parts by weight of styrene, α-methylstyrene, nuclear-substituted styrene, methyl methacrylate, acrylonitrile, methacrylonitrile, maleic anhydride, N-substituted maleimide or mixtures thereof, on B.2) 95 to 10 parts by weight, preferably 80 to 20 parts by weight and particularly preferably 75 to 40 parts by weight of at least one rubber having a glass transition temperature of $\leq 10°$ C.

and

C) 0.05 to 10 parts by weight, preferably 0.1 to 8 parts by weight and particularly preferably 0.5 to 5 parts by weight, in each case per 100 parts by weight of A)+B), of a combination of at least 3 components selected from compounds I), II), III) and IV), wherein I) denotes a compound with at least one structural unit

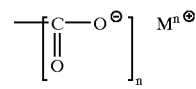

where
M=metal, preferably Mg, Ca, Zn
n=valency of the metal M, preferably 1 or 2
II) denotes a compound with at least one structural unit

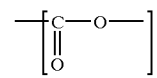

and at least one structural unit

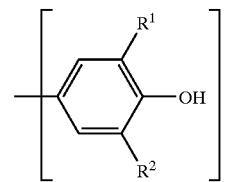

wherein $R^1$ and $R^2$ are, independently of one another, H or $C_1$–$C_{20}$ hydrocarbon radicals,
III) denotes a compound with at least one structural unit

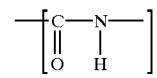

and
IV) denotes a compound with structural units that are different from the specified structural units or combination of structural units contained in the compounds (I) to (III), i.e. the compounds (IV) contain none of the structural units or combinations of structural units contained in the compounds (I) to (III).

Preferably each of the compounds I) to IV) contains at least one terminal aliphatic $C_6$–$C_{32}$ hydrocarbon radical.

According to the invention suitable thermoplastic polymers A) are those of styrene, α-methylstyrene, p-methylstyrene, vinyltoluene, halogenated styrene, methyl acrylate, methyl methacrylate, acrylonitrile, maleic anhydride, N-substituted maleimide or mixtures thereof.

The polymers A) are resin-like, thermoplastic and rubber-free. Particularly preferred polymers A) are those of styrene, methyl methacrylate, styrene/acrylonitrile mixtures, styrene/acrylonitrile/methyl methacrylate mixtures, styrene/methyl methacrylate mixtures, acrylonitrile/methyl methacrylate mixtures, α-methylstyrene/acrylonitrile mixtures, styrene/α-methylstyrene/acrylonitrile mixtures, α-methylstyrene/methyl methacrylate/acrylonitrile mixtures, styrene/α-methylstyrene/methyl methacrylate mixtures, styrene/(α- methylstyrene/methyl methacrylate/acrylonitrile mixtures, styrene/maleic anhydride mixtures, methyl methacrylate/maleic anhydride mixtures, styrene/methyl methacrylate/maleic anhydride mixtures and styrene/acrylonitrile/N-phenylmaleimide mixtures.

The polymers A) are known and can be produced by free-radical polymerisation, in particular by emulsion, suspension, solution or bulk polymerisation. The polymers preferably have molecular weights $\overline{M}_w$ of 20,000 to 200,000 and intrinsic viscosities [η] of 20 to 110 ml/g (measured in dimethylformamide at 25° C.).

Suitable rubbers for the production of the graft polymers B) are in particular polybutadiene, butadiene/styrene copolymers, butadiene/acrylonitrile copolymers, polyisoprene or alkyl acrylate rubbers based on $C_1$–$C_8$ alkyl acrylates, in particular ethyl acrylate, butyl acrylate and ethylhexyl acrylate.

The acrylate rubbers may optionally contain up to 30 wt. % (referred to the rubber weight) of monomers such as vinyl acetate, acrylonitrile, styrene, methyl methacrylate and/or vinyl ether incorporated by copolymerisation. The acrylate rubbers may also contain small amounts, preferably up to 5 wt. % (referred to the weight of rubber) of crosslinking, ethylenically unsaturated monomers incorporated by polymerisation. Crosslinking agents are for example alkylene diol diacrylates and methacrylates, polyester diacrylates and methacrylates, divinyl benzene, trivinyl benzene, triallyl cyanurate, allyl acrylate and methacrylate, butadiene and isoprene. Graft bases may also be acrylate rubbers with a core/shell structure, with a core of crosslinked diene rubber of one or more conjugated dienes such as polybutadiene, or a copolymer of a conjugated diene with an ethylenically unsaturated monomer such as styrene and/or acrylonitrile.

Further suitable rubbers are for example the so-called EPDM rubbers (polymers of ethylene, propylene and a non-conjugated diene such as for example dicyclopentadiene), EPM rubbers (ethylene/propylene rubbers) and silicone rubbers that may optionally have a core/shell structure.

Preferred rubbers for the production of the graft polymers B) are diene rubbers and alkyl acrylate rubbers as well as EPDM rubbers.

The rubbers in the graft polymer B) are present in the form of at least partially crosslinked particles having a mean particle diameter ($d_{50}$) of 0.05 to 20 μm, preferably 0.1 to 2 μm and particularly preferably 0.1 to 0.8 μm. The mean particle diameter $d_{50}$ is determined by ultracentrifuge measurements according to W. Scholtan et al., Kolloid-Z. u.Z. Polymere 250 (1972), 782–796, or by evaluating electron microscope images.

The polymers B) may be produced by free-radical graft polymerisation of the monomers B.1) in the presence of the rubbers B.2) to be grafted on.

Preferred processes for producing the graft polymers B) are emulsion, solution, bulk or suspension polymerisation and combinations known per se of these processes. Particularly preferred graft polymers B) are ABS polymers.

Most particularly preferred polymers B) are products that have been obtained by free-radical polymerisation of mixtures of styrene and acrylonitrile, preferably in a weight ratio of 10:1 to 1:1, particularly preferably in a weight ratio of 5:1 to 2:1, in the presence of at least one rubber built up predominantly from diene monomers (preferably polybutadiene that may contain up to 30 wt. % of styrene and/or acrylonitrile incorporated as comonomers) and having a mean particle diameter ($d_{50}$) of 100 to 450 nm, most particularly preferably in the presence of two rubbers built up predominantly from diene monomers (preferably polybutadiene that may contain up to 30 wt. % and/or acrylonitrile incorporated as comonomers) and having a) a mean particle diameter ($d_{50}$) of 150 to 300 nm and b) a mean particle diameter ($d_{50}$) of 350 to 450 nm, in a weight ratio (a):(b)= 10:90 to 90:10, preferably 30:70 to 60:40.

The rubber content of the polymers B) is preferably 40 to 95 wt. %, particularly preferably 50 to 90 wt. % and most particularly preferably 55 to 85 wt. %.

As individual components of the additive mixture C) the following compounds are for example suitable and preferred:

As component I)
    magnesium stearate, calcium stearate, zinc stearate, magnesium montanate, calcium montanate, zinc montanate, magnesium behenate, calcium behenate, zinc behenate, magnesium oleate, calcium oleate, zinc oleate; magnesium stearate and calcium stearate are preferred, magnesium stearate being particularly preferred.

As component II)
    esters of 3,5-di-tert.-butyl-4-hydroxyphenylacetic acid with monohydric or polyhydric alcohols, such as for example and preferably decanol, undecanol, dodecanol, tridecanol, tetradecanol, pentadecanol, hexadecanol, octadecanol, 1,6-hexanediol, neopentyl glycol, 1,9-nonanediol, ethylene glycol, diethylene glycol, triethylene glycol, pentaerythritol, 3-thiaundecanol, 3-thiapentadecanol, trimethylol propane.

Esters of β-(3,5-di-tert.-butyl-4-hydroxyphenyl)-propionic acid with monohydric or polyhydric alcohols, such as for example and preferably decanol, undecanol, dodecanol, tridecanol, tetradecanol, pentadecanol, hexadecanol, octadecanol, 1,6-hexanediol, neopentyl glycol, 1,9-nonanediol, ethylene glycol, diethylene glycol, triethylene glycol, pentaerythritol, 3-thiaundecanol, 3-thiapentadecanol, trimethylol propane.

Esters of β-(5-tert.-butyl-4-hydroxy-3-methylphenyl)-propionic acid with monohydric or polyhydric alcohols, such as for example and preferably decanol, undecanol, dodecanol, tridecanol, tetradecanol, pentadecanol, hexadecanol, octadecanol, 1,6-hexanediol, neopentyl glycol, 1,9-nonanediol, ethylene glycol, diethylene glycol, triethylene glycol, pentaerythritol, 3-thiaundecanol, 3-thiapentadecanol, trimethylol propane.

Esters of β-(3,5-dicyclohexyl-4-hydroxyphenyl)-propionic acid with monohydric or polyhydric alcohols, such as for example and preferably decanol, undecanol, dodecanol, tridecanol, tetradecanol, pentadecanol, hexadecanol, octadecanol, 1,6-hexanediol, neopentyl glycol, 1,9-nonanediol, ethylene glycol, diethylene glycol, triethylene glycol, pentaerythritol, 3-thiaundecanol, 3-thiapentadecanol, trimethylol propane.

Preferred are esters of β-(3,5-di-tert.-butyl-4-hydroxyphenyl)-propionic acid and/or of β-(5-tert.-butyl-4-hydroxy-3-methylphenyl)-propionic acid, and particularly preferred are esters of β-(3,5-di-tert.-butyl-4-hydroxyphenyl)-propionic acid.

As component III)
    ethylenediamine bisstearyl amide, erucic acid amide, oleic acid amide, stearic acid amide, behenic acid amide, montanic acid amide; ethylenediamine bisstearyl amide and/or erucic acid amide are preferred, ethylenediamine bisstearyl amide being particularly preferred.

As component IV)
    paraffin oils, hydrocarbon waxes, low molecular weight polystyrene produced by using $C_8$–$C_{18}$ alkyl mercaptans as molecular weight regulators with mean molecular weights $(\overline{M})_w$ between 2,000 and 15,000, preferably between 2,500 and 12,000 and particularly preferably between 3,000 and 10,000, low molecular weight styrene/acrylonitrile copolymer produced by using $C_8$–$C_{18}$ alkyl mercaptans as molecular weight regulators with mean molecular weights $(\overline{M})_w$ between 2,000 and 15,000, preferably between 2,500 and 12,000 and particularly preferably between 3,000 and 10,000, low molecular weight α-methylstyrene/acrylonitrile copolymer produced by using $C_8$–$C_{18}$ alkyl mercaptans as molecular weight regulators with mean molecular weights $(\overline{M})_w$ between 2,000 and 15,000, preferably between 2,500 and 12,000 and particularly preferably between 3,000 and 10,000, low molecular weight poly (methyl methacrylate) produced by using $C_8$–$C_{18}$ alkyl mercaptans as molecular weight regulators with mean molecular weights $(\overline{M})_w$ between 2,000 and 15,000, preferably between 2,500 and 12,000 and particularly preferably between 3,000 and 10,000, $C_6$–$C_{32}$ alkanols, for example and preferably stearyl alcohol, and $C_6$–$C_{32}$ alkenols, for example and preferably oleyl alcohol.

Preferred are paraffin oils, low molecular weight styrene/acrylonitrile copolymers or α-methylstyrene/acrylonitrile copolymers, and particularly preferred are paraffin oils or low molecular weight styrene/acrylonitrile copolymers or, in each case, mixtures thereof.

Preferably all the components I), II), III), and IV) have a molecular weight above 300, preferably above 400 and particularly preferably above 500.

The quantitative ratios for the use according to the invention of at least three components selected from the components I), II), III), and IV) may be varied within wide ranges. The ratios are selected so that the following relationship is observed

| | |
|---|---|
| particularly preferred | (I) ≦ (IV) ≦ (II) ≦ (III) |
| most particularly preferred | (I) ≦ (IV) ≦ (II) < (III) and (I) < (IV) ≦ (II) < (III) |
| or so that the following relationship is observed | (I) ≦ (IV) ≦ (III) ≦ (II) |
| particularly preferred | (I) ≦ (IV) < (III) ≦ (II) and |
| most particularly preferred | (I) < (IV) < (III) ≦ (II) |

Particularly preferred mixtures contain 15 to 65 wt. % of graft polymer of 25 to 60 parts by weight of styrene, α-methylstyrene, acrylonitrile, N-phenylmaleimide or mixtures thereof on 75 to 40 parts by weight of polybutadiene, 85 to 35 wt. % of thermoplastic copolymer of 5 to 40 parts by weight of acrylonitrile and 95 to 60 parts by weight of styrene, α-methylstyrene, N-phenylmaleimide or mixtures thereof, and 0.5 to 5 parts by weight per 100 parts by weight of A+B of a combination of at least 3 components selected from
I) magnesium stearate,
II) octadecyl-3-(3,5-di-tert.butyl-4-hydroxyphenyl)-propionate or tetradecyl-3-(3,5-di-tert.butyl-4-hydroxyphenyl)-propionate or dodecyl-3-(3,5-di-tert.butyl-4-hydroxyphenyl)-propionate,
III) ethylenediamine bisstearyl amide
IV) paraffin oil or low molecular weight styrene/acrylonitrile copolymer.

The mixtures according to the invention containing A), B) and C) and optionally conventional additives such as processing aids, stabilisers, pigments, antistatics and fillers are prepared by mixing the respective constituents in a manner known per se simultaneously or successively at room temperature or at elevated temperature, following which the resultant mixtures are melt-compounded or melt-extruded at temperatures of 150° C. to 300° C. in conventional equipment such as internal mixers, extruders or double-shaft screw extruders.

The moulding compounds or compositions of the present invention may be used to produce moulded articles of all types, in which connection conventional production procedures may be employed, and in particular moulded articles may be produced by injection moulding.

A further type of processing of the moulding compositions according to the invention is the production of moulded articles by thermoforming from sheets or films previously fabricated by known methods.

The subject of the present invention is therefore furthermore the process for the production of the moulding compositions, their use for the production of moulded articles, as well as moulded articles obtainable therefrom. The subject of the present invention is moreover the additive combination according to component C.

EXAMPLES

Thermoplastic Resin A1

A statistical styrene/acrylonitrile (72:28) copolymer with a $\overline{M}_w$ of ca. 115,000 determined by GPC (gel permeation chromatography).

Thermoplastic Resin A2

A statistical α-methylstyrene/acrylonitrile (72:28) copolymer with a $\overline{M}_w$ of ca. 75,000 determined by GPC.

Graft Polymer B1

Graft product obtained by emulsion polymerisation of 42 wt. % of a styrene/acrylonitrile mixture (weight ratio 73:27) on 58 wt. % of a 1:1 mixture (weight ratio) of two particulate polybutadienes with a) a mean particle diameter ($d_{50}$) of 290 nm and b) a mean particle diameter ($d_{50}$) of 420 nm. The product is worked up by coagulating the latex with magnesium sulfate, washing with water, followed by drying in vacuo.

Graft Polymer B2

Graft product obtained by emulsion polymerisation of 50 wt. % of a styrene/acrylonitrile mixture (weight ratio 73:27) on 50 wt. % of particulate polybutadiene with a mean particle diameter ($d_{50}$) of 130 nm. The product is worked up as under B1.

| | |
|---|---|
| Additive CI1: | magnesium stearate (Barlocher, Munich, Germany) |
| Additive CI2: | calcium stearate (Bärlocher, Munich, Germany) |
| Additive CII1: | octadecyl-3-(3,5-di-tert.butyl-4-hydroxyphenyl)-propionate (Irganox 1076 ®, Ciba Speciality, Basle, Switzerland) |
| Additive CII2: | pentaerythrityl-tetrakis-[3-(3,5-di-tert.butyl-4-hydroxyphenyl)-propionate] (Irganox 1010 ®, Ciba Speciality) |
| Additive CIII1: | ethylenediamine bisstearyl amide (Henkel KG, Düsseldorf, Germany) |
| Additive CIV1: | low molecular weight styrene/acrylonitrile copolymer ($\overline{M}_w$ ≈ 4,200, determined by GPC) produced by free-radical emulsion polymerisation of a mixture of 63.9 parts by weight of styrene, 23.6 parts by weight of acrylonitrile and 12.5 parts by weight of tert.-dodecyl mercaptan. |
| Comparison additive V: | Vulkanox BKF ® (Bayer AG; Leverkusen, Germany) |

The individual components are compounded in the weight proportions specified in Table 1 in a 1.3 l capacity internal mixer at temperatures of 160° C. to 200° C. The moulded articles are produced in an injection moulding machine at 240° C.

The notched-bar impact strength is measured at room temperature ($a_k^{RT}$) and at −30° C. ($a_k^{-30° \, C.}$) according to ISO 180/1A (unit:kJ/m$^2$), and the thermoplastic flowability is evaluated by measuring the melt flow index (MVR) according to DIN 53 735 U (unit:cm$^3$/10 min).

As can also be seen from Table 1, only by using the mixtures according to the invention can a very good combination of high toughness even at low temperatures and good processability be obtained.

TABLE 1

Compositions and Test Data of the Moulding Compositions

| Example No. | A1 Parts by weight | A2 Parts by weight | B1 Parts by weight | B2 Parts by weight | CI1 Parts by weight | CI2 Parts by weight | CII1 Parts by weight | CII2 Parts by weight | CIII1 Parts by weight | CIV1 Parts by weight | V Parts by weight | $a_k^{RT}$ (kJ/m$^2$) | $a_k^{-30°\ C.}$ (kJ/m$^2$) | MVR (cm$^3$/10 min) |
|---|---|---|---|---|---|---|---|---|---|---|---|---|---|---|
| 1 | 70 | — | 30 | — | — | — | 2 | — | 1 | 0.5 | — | 18.5 | 16.4 | 10.3 |
| 2 | 70 | — | 30 | — | — | — | 1 | — | 2 | 0.5 | — | 18.5 | 16.5 | 11.3 |
| 3 | 70 | — | 30 | — | 0.5 | — | 2 | — | — | 0.5 | — | 18.7 | 16.2 | 9.2 |
| 4 | 70 | — | 30 | — | 0.5 | — | 2 | — | 1 | 0.5 | — | 18.5 | 16.4 | 10.6 |
| 5 | 70 | — | 30 | — | — | 0.5 | 1 | — | 2 | 0.5 | — | 19.6 | 16.7 | 11.7 |
| 6 | 70 | — | 30 | — | — | — | — | 1 | 2 | 0.5 | — | 19.1 | 16.4 | 11.2 |
| 7 (comp.) | 70 | — | 30 | — | — | — | 2 | — | — | 0.5 | — | 15.8 | 8.3 | 9.1 |
| 8 (comp.) | 70 | — | 30 | — | — | — | 2 | — | — | — | — | 16.4 | 8.7 | 8.6 |
| 9 (comp.) | 70 | — | 30 | — | — | — | — | — | 2 | 0.5 | 1 | 16.2 | 7.8 | 8.0 |
| 10 | — | 75 | 12.5 | 12.5 | — | — | 2 | — | 1 | 0.5 | — | 17.4 | 7.5 | 5.6 |
| 11 | — | 75 | 12.5 | 12.5 | 0.5 | — | 2 | — | 1 | 0.5 | — | 17.9 | 7.1 | 5.9 |
| 12 | — | 75 | 12.5 | 12.5 | — | 0.5 | 2 | — | 1 | 0.5 | — | 17.7 | 7.4 | 6.0 |
| 13 | — | 75 | 12.5 | 12.5 | 0.5 | — | — | 2 | 1 | 0.5 | — | 18.1 | 7.5 | 6.0 |
| 14 (comp.) | — | 75 | 12.5 | 12.5 | — | — | 2 | — | — | 0.5 | — | 13.0 | 7.3 | 4.9 |
| 15 (comp.) | — | 75 | 12.5 | 12.5 | — | — | 2 | — | — | — | — | 13.8 | 7.3 | 4.4 |
| 16 (comp.) | — | 75 | 12.5 | 12.5 | — | — | — | — | — | — | — | 10.3 | 6.8 | 4.9 |
| 17 (comp.) | — | 75 | 12.5 | 12.5 | — | — | — | — | — | 0.5 | — | 6.7 | n.b. | 4.9 |
| 18 (comp.) | — | 75 | 12.5 | 12.5 | — | — | — | — | 1 | 0.5 | — | 12.1 | 6.7 | 5.8 |
| 19 (comp.) | — | 75 | 12.5 | 12.5 | 0.5 | — | — | — | — | 0.5 | — | 10.9 | 6.3 | 4.5 |
| 20 (comp.) | — | 75 | 12.5 | 12.5 | — | — | — | — | 1 | — | — | 11.9 | 7.1 | 5.3 |
| 21 (comp.) | — | 75 | 12.5 | 12.5 | 0.5 | — | — | — | — | — | — | 11.5 | 6.9 | 4.1 |
| 22 (comp.) | — | 75 | 12.5 | 12.5 | — | — | — | — | 1 | 0.5 | 2 | 13.5 | 6.8 | 4.6 | n.b. = not measured

What is claimed is:

1. A thermoplastic molding composition consisting of:

A) 5 to 95% relative to the weight of the composition of a (co)polymer of at least one monomer selected from the group consisting of styrene, α-methylstyrene, nuclear-substituted styrene, methyl methacrylate, acrylonitrile, methacrylonitrile, maleic anhydride and N-substituted maleimide;

B) 5 to 95% relative to the weight of the composition of a graft polymer of
  B.1) 5 to 90 parts by weight, per 100 parts by weight of B, of at least one member selected from the group consisting of styrene, α-methylstyrene, nuclear-substituted styrene, methyl methacrylate, acrylonitrile, methacrylonitrile, maleic anhydride and N-substituted maleimide on
  B.2) 95 to 10 parts by weight, per 100 parts by weight of B, of at least one rubber having a glass transition temperature of ≦10° C.;

C) 0.05 to 10 parts per 100 parts by weight of A+B, of a mixture of at least 3 components selected from the group consisting of compounds I), II), III) and IV),
  wherein I) denotes a compound the molecular structure of which contains at least one unit conforming to

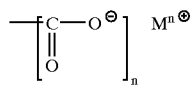

where M denotes metal and n is the valence of the metal M,
  wherein II) denotes a compound the molecular structure of which contains at least one unit conforming to

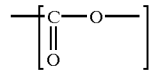

and at least one structural unit conforming to

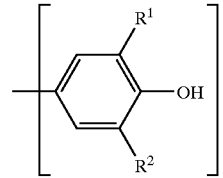

wherein $R^1$ and $R^2$ independently of one another denote H or $C_1$–$C_{20}$ hydrocarbon radicals,
  wherein III) denotes a compound the molecular structure of which contains at least one unit conforming to

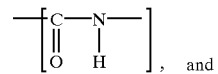, and and,
  wherein IV) denotes at least one member selected from the group consisting of paraffin oil, hydrocarbon wax, polystyrene having a weight average molecular weight of 2,000 to 15,000 the molecular weight regulator of which is $C_8$–$C_{18}$ alkyl mercaptan, styrene/acrylonitrile copolymer having a weight average molecular weight of 2,000 to 15,000 the molecular weight regulators of which is $C_8$–$C_{18}$ alkyl mercaptan, α-methylstyrene/acrylonitrile copolymer having a weight average molecular weight of 2,000 to 15,000 the molecular weight regulators of which is $C_8$–$C_{18}$ alkyl mercaptan, poly(methyl methacrylate) having a weight average molecular weights of 2,000 to 15,000, the molecular weight regulator of which is $C_8$–$C_{18}$ alkyl mercaptan, $C_6$–$C_{32}$ alkanols, and $C_6$–$C_{32}$ alkenols;

D) optionally at least one member selected from the group consisting of paraffin oil, low molecular weight styrene/acrylonitrile copolymer and α-methyl styrene/acrylonitrile copolymer; and E) optionally at least one member selected from the group consisting of processing aid, stabilizer, pigment, antistatic agent and filler.

2. The composition of claim 1 wherein each of (I), (II) and (III) and (IV) is a compound containing at least one terminal $C_6$–$C_{32}$ hydrocarbon radical.

3. The composition of claim 1 wherein (I) is a compound selected from the group consisting of magnesium stearate, calcium stearate, zinc stearate, magnesium montanate, calcium montanate, zinc montanate, magnesium behenate, calcium behenate, zinc behenate, magnesium oleate, calcium oleate and zinc oleate.

4. The composition of claim 1 wherein (II) is an ester of monohydric alcohol or of polyhydric alcohol and an acid selected from the group consisting of 3,5-di-tert.-butyl-4-hydroxyphenylacetic acid, β-(3,5-di-tert.-butyl-4-hydroxyphenyl)-propionic acid, β-(5-tert.-butyl-4-hydroxy-3-methylphenyl)-propionic acid and β-(3,5-dicyclohexyl-4-hydroxy-phenyl)-propionic acid.

5. The composition of claim 1 wherein (III) is a member selected from the group consisting of ethylenediamine bisstearyl amide, erucic acid amide, oleic acid amide, stearic acid amide, behenic acid amide and montanic acid amide.

6. The composition of claim 1 wherein said (I) is magnesium stearate or calcium stearate, and said (II) is octadecyl-3-(3,5-di-tert.butyl-4-hydroxyphenyl)-propionate, and said (III) is ethylenediamine bisstearyl amide or erucic acid amide.

7. The composition of claim 1 wherein the quantitative ratios of components (I), (II) and (III) and (IV) have the following relationship $$(I) \leq (IV) \leq (II) \leq (III) \text{ or } (I) \leq (IV) \leq (III) \leq (II).$$

8. The composition of claim 1 wherein C) is present in an amount of 0.5 to 5 parts per 100 parts by weight of A+B.

9. The composition of claim 1 wherein said rubber B.2) of said graft polymer B) is selected from the group consisting of diene rubber, alkyl acrylate rubbers and EPDM rubber.

10. A method of using the composition of claim 1 comprising producing a molded article.

11. A molded article comprising the composition of claim 1.

* * * * *